United States Patent Office 3,269,907
Patented August 30, 1966

3,269,907
PROCESS FOR CRYSTALLIZING ACTINO-
SPECTACIN FREE BASE
Heinz K. Jahnke, Kalamazoo, Mich., assignor to The Upjohn Company, Kalamazoo, Mich., a corporation of Delaware
No Drawing. Filed July 31, 1962, Ser. No. 213,622
2 Claims. (Cl. 167—65)

This invention pertains to a novel chemical process, and is particularly directed to an improved process for recovering actinospectacin as the crystalline free base. More particularly, the invention is directed to a novel method which comprises crystallization of substantially pure actinospectacin free base from concentrated aqueous solutions containing the same by the addition of acetone.

Actinospectacin is a novel biosynthetic product produced by the controlled fermentation of *Streptomyces spectabilis*, NRRL 2792. Various methods for the production, recovery, and purification of actinospectacin sulfate are described in the published literature, e.g., D. J. Mason et al., Antibiotics and Chemotherapy, 11, p. 118, 1961; M. E. Bergy et al., Antibiotics and Chemotherapy, 11, p. 661, 1961; Union of South Africa Patent No. 60/4098 and Belgian Patent No. 596,175.

In accordance with known procedures, the free base of actinospectacin is formed by the passage of a solution of actinospectacin salts over a strongly basic anion exchange resin. Suitable anion exchange resins for this purpose are obtained by chloromethylating a copolymer of styrene and divinylbenzene and reacting the chloromethylated product with trimethylamine, or dimethylethanolamine, by the procedure given on pages 84, 88 and 97 of Kunin, Ion Exchange Resins, 1958, 2nd Ed., John Wiley and Sons, Inc., New York. Anion exchange resins of this type are marketed under the tradenames of Dowex 1, Dowex 2, Dowex 21K, Amberlite IRA-400, Amberlite IRA-401, Amberlite IRA 410 and Duolite A-102. This method of preparing the free base of actinospectacin is unsatisfactory because it exposes the antibiotic to a high local concentration of hydroxyl ions at the resin surface. This condition leads to the partial degradation of the actinospectacin.

Now, in accordance with this invention, crystalline actinospectacin free base is prepared via a process which does not have the disadvantage of the above mentioned ion exchange process. As a result, a better yield of the desired product is obtained.

The process of this invention can be practiced as described below. Actinospectacin sulfate is slurried in water at 0 to 5° C. Two equivalents of an ice-cold solution of an alkali metal hydroxide, for example, sodium hydroxide (preferred), potassium hydroxide, lithium hydroxide, and the like, is then added and the solution is vigorously agitated. A water-miscible solvent, for example, acetone is then added to the solution in an amount sufficient to precipitate the inorganic salts. The solution is filtered immediately through a pad or filter aid, for example, diatomaceous earth, to remove the inorganic salts present. The crystallization of actinospectacin free base in the filtrate starts spontaneously. Further addition of acetone to the filtrate can be advantageously employed to realize a complete crystallization. Upon completion of the crystallization, the crystalline hydrated free base of actinospectacin can be removed by filtration, washed with aqueous acetone, and then dried under reduced pressure to yield a highly purified preparation of actinospectacin free base.

The amount of solvent added to precipitate the inorganic salts is dependent on the concentration of inorganic salts and the antibiotic in solution as the higher the concentration of antibiotic, the more rapid is the rate of its crystallization. Effective precipitation of the inorganic salts without premature crystallization of the antibiotic can ordinarily be obtained with the addition of between about 2 and about 3 volumes of acetone.

In the event the antibiotic crystallizes before the filtration of the inorganic salts has been completed, the moist cake can be slurried with water to which acetone is added and then filtered again. Crystallization can then be induced by addition of more acetone to the filtrate accompanied, advantageously, by seeding.

Alternatively, when crystallization occurs before the filtration of the inorganic salts has been completed, the solids retained by the filter can be dried under reduced pressure, slurried with absolute methanol to dissolve the actinospectacin, filtered, and then evaporated under reduced pressure. The removal of the methanol must be complete. A temperature not exceeding 10° C. is advantageous during distillation. The dry residue can then be dissolved in water and crystallized by the addition of acetone.

Actinospectacin free base has the same antibacterial spectrum as actinospectacin sulfate, and can be used to control the same microorganisms, particularly in alkaline environments. In acid environments it is particularly advantageous as an antibacterial buffering agent.

The following example is illustrative of the process of the present invention, but is not to be construed as limiting. All percentages are by weight and all solvent mixture proportions are by volume unless otherwise noted.

EXAMPLE 1.—ACTINOSPECTACIN FREE BASE

One kilogram of actinospectacin sulfate was slurried with 2 liters of water at 0° C. To this was added an ice-cold solution of 160 g. of sodium hydroxide in 600 ml. of water. The solution was vigorously agitated. Eight liters of acetone, pre-cooled to −10° C., were then added to the solution and the solution was filtered immediately through a pad of filter aid composed of diatomaceous earth. Actinospectacin free base in the filtrate began to crystallize spontaneously. Another five liters of pre-cooled acetone were added to the filtrate with agitation. The crystallization was completed by keeping the temperature of the filtrate at +5 to −10° C. overnight. The crystalline, hydrated free base of actinospectacin was removed by filtration, washed with aqueous acetone (5:1 acetone-water), then with anhydrous acetone and dried under reduced pressure (less then one millimeter mercury) to yield 730 g. of actinospectacin free base assaying 785 mcg. of actinospectacin per mg.; having an equivalent weight of 179; an optical rotation $[\alpha]_D^{25} = -9°$ (c=1.0% in $H_2O$)

and the following elemental analysis: C, 49.64; H, 6.64; N, 9.05. The yield for the process was 92%.

Treatment of a portion of the free base with the calculated amount of sulfuric acid gave actinospectacin sulfate.

I claim:

1. The process for the conversion of actinospectacin sulfate to the free base which comprises adding an alkali metal hydroxide to an aqueous solution of actinospectacin sulfate, adding a water-miscible organic solvent to precipitate inorganic sulfate salts thus formed, filtering, and crystallizing the actinospectacin free base from the filtrate.

2. The process for the conversion of actinospectacin sulfate to the free base which comprises adding sodium hydroxide to an aqueous solution of actinospectacin sulfate, precipitating the inorganic salts with acetone, filtering, and crystallizing the actinospectacin free base from the filtrate.

References Cited by the Examiner

UNITED STATES PATENTS 3,043,844   7/1962   Elpern _____ 260—293.4

JULIAN S. LEVITT, *Primary Examiner.*

S. ROSEN, *Assistant Examiner.*